US011600972B2

(12) United States Patent
Rosa et al.

(10) Patent No.: US 11,600,972 B2
(45) Date of Patent: Mar. 7, 2023

(54) EMBEDDED WIRE REMOVAL TOOL

(71) Applicant: Raytheon Company, Waltham, MA (US)

(72) Inventors: Jason Rosa, Attleboro, MA (US); Peter Willey, Rumford, RI (US); Curtis B. Carlsten, Seekonk, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/150,445

(22) Filed: Jan. 15, 2021

(65) Prior Publication Data

US 2022/0231490 A1 Jul. 21, 2022

(51) Int. Cl.
*H02G 1/12* (2006.01)
*B21F 13/00* (2006.01)

(52) U.S. Cl.
CPC ........... *H02G 1/1204* (2013.01); *B21F 13/00* (2013.01)

(58) Field of Classification Search
None
See application file for complete search history.

(56) References Cited

U.S. PATENT DOCUMENTS

| 3,361,016 | A | * | 1/1968 | Carpenter | H02G 1/1224 81/9.51 |
| 3,612,412 | A | * | 10/1971 | Graveman | H01B 7/36 241/101.5 |
| 5,337,479 | A | * | 8/1994 | Ducret | H02G 1/1229 30/91.2 |
| 5,669,275 | A | * | 9/1997 | Mills | H02G 1/1221 82/47 |
| 6,363,604 | B1 | * | 4/2002 | Sakuma | H02G 1/1256 81/9.51 |
| 9,270,095 | B2 | * | 2/2016 | Johnston | H02G 1/1217 |
| 10,032,544 | B2 | * | 7/2018 | Furuhata | H01B 13/0167 |
| 10,033,168 | B2 | * | 7/2018 | Watkins | H02G 1/1224 |
| 2003/0188432 | A1 | * | 10/2003 | Temple | H02G 1/1229 30/90.6 |
| 2007/0144011 | A1 | * | 6/2007 | Ducret | H02G 1/005 30/90.1 |
| 2012/0279359 | A1 | * | 11/2012 | Homma | G02B 6/245 81/9.41 |
| 2014/0318323 | A1 | * | 10/2014 | Zhang | H02G 1/1221 81/9.51 |
| 2022/0231490 | A1 | * | 7/2022 | Rosa | H02G 1/1268 |

FOREIGN PATENT DOCUMENTS

| EP | 1054494 A2 | 11/2000 |
| JP | H01-177810 A | 7/1989 |
| JP | H09-304674 A | 11/1997 |

OTHER PUBLICATIONS

International Search Report for International Application No. PCT/US2021/059428 dated Feb. 25, 2022, 31 pages.

* cited by examiner

*Primary Examiner* — Hwei-Siu C Payer

(57) ABSTRACT

An embedded wire removal tool is disclosed. The embedded wire removal tool can include a feed mechanism operable to cause movement of a cable. The cable can have a jacket about a core. The cable can also include a wire disposed about the core and at least partially embedded in the jacket. The embedded wire removal tool can also include a jacket cutter operable to receive the cable from the feed mechanism and remove at least a portion of the jacket. In addition, the embedded wire removal tool can include a wire excavator operable to separate the wire from the core.

23 Claims, 9 Drawing Sheets

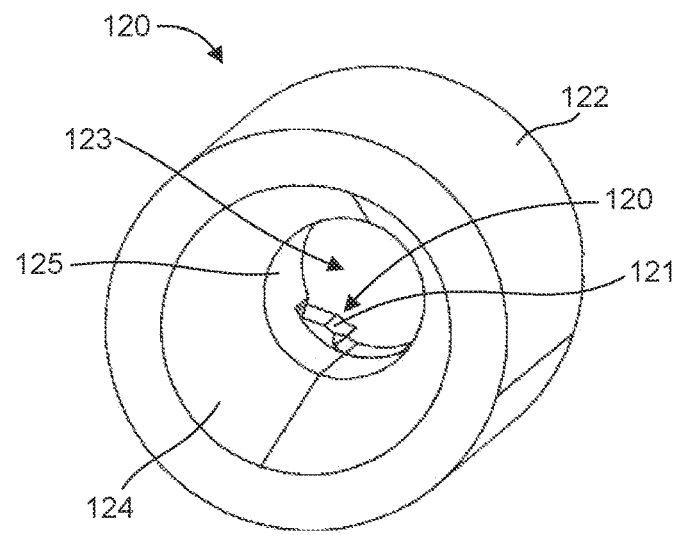
FIG. 4A
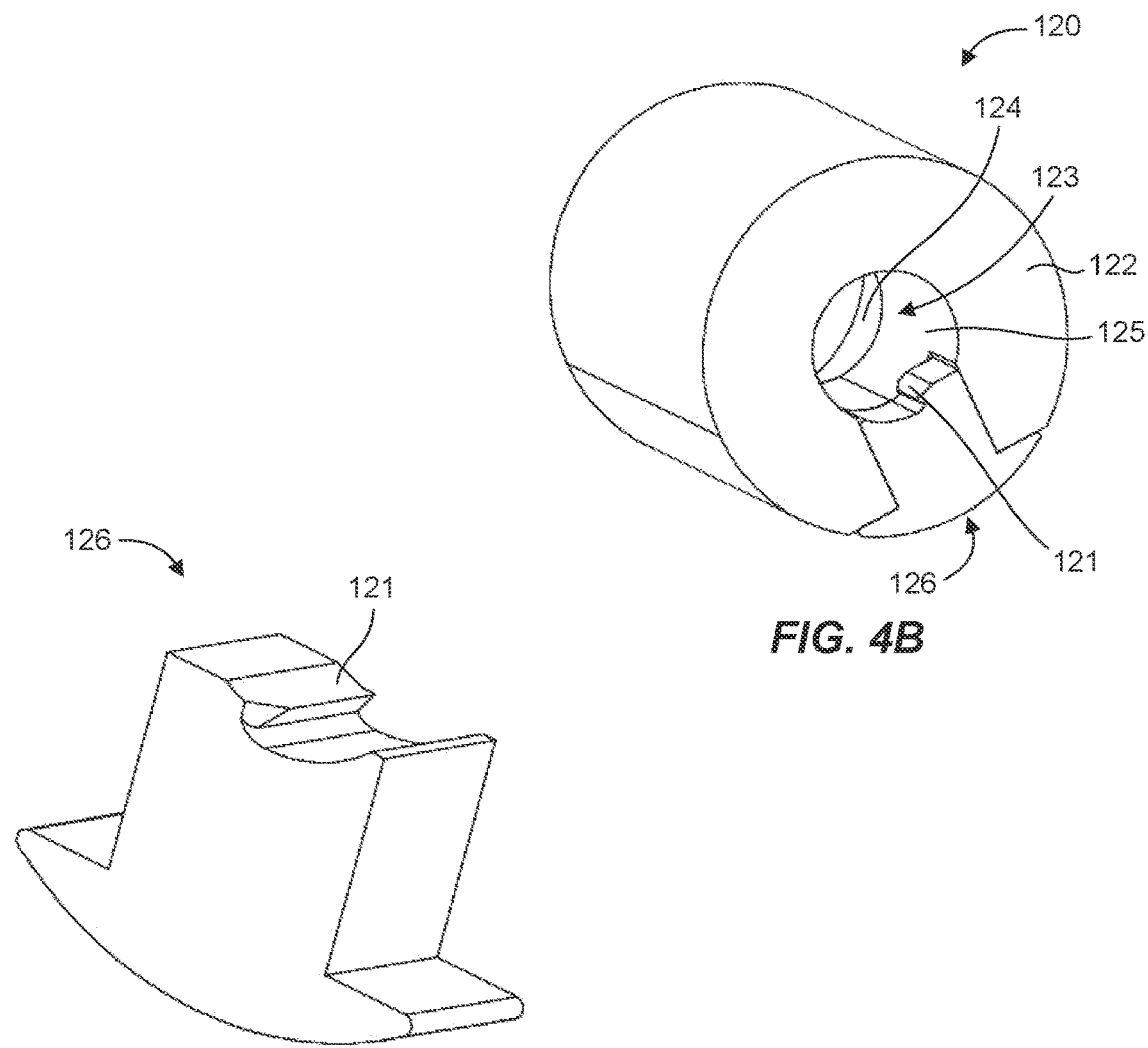
FIG. 4B
FIG. 5

EMBEDDED WIRE REMOVAL TOOL

BACKGROUND

A typical cable assembly may include a core, a wire/conductor (e.g., a low-voltage conductor) located external to (e.g., spiral wound about) the cable core, and an outer protective jacket or housing covering the wire/conductor and the core. Large, continuous cable assemblies are subject to damage or defects during the manufacturing or installation process. To remedy this, the defect area of the cable is cut out and the remaining acceptable cable ends are spliced or coupled together to avoid scrapping the previously accepted lengths of cable. Processes and tooling exist to splice a cable core, which typically includes of a number of conductors, fibers, and strength members. However, no specialized tooling or process is currently available to aid in splicing of wires/conductors that are located external to the cable core and within an outer cable jacket or housing.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIGS. 4A and 4B are perspective views of a jacket cutter of the embedded wire removal tool of FIGS. 1-3C.

FIG. 5 illustrates a blade insert of the jacket cutter of FIGS. 4A and 4B.

Figure 1:
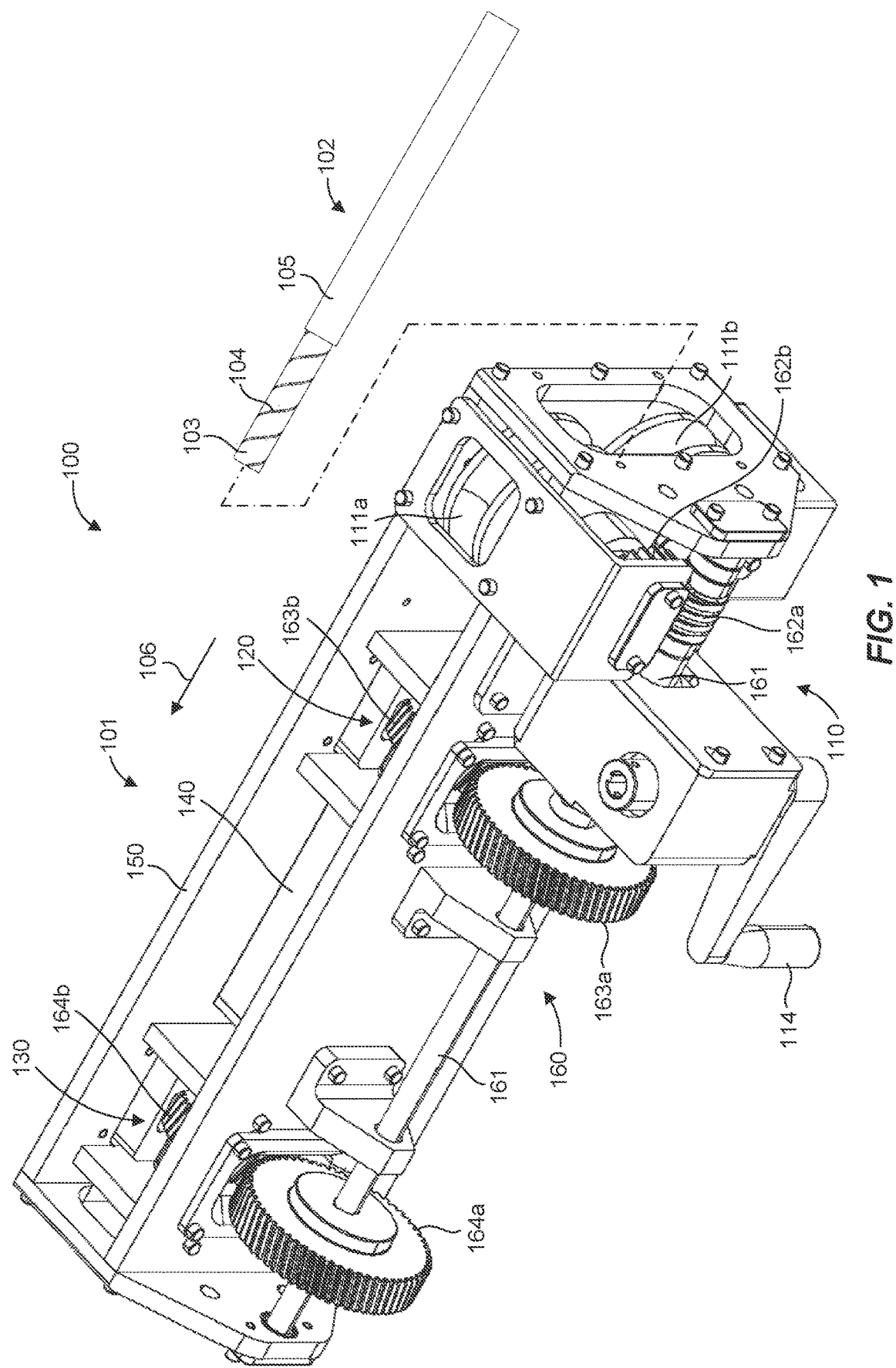
FIG. 1 is an illustration of an embedded wire removal system in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Although various hand-tools, such as wire strippers, knives, pliers, etc., can be utilized to remove embedded wires/conductors that are located external to a cable core and within an outer cable jacket or housing, the effectiveness of such tools is highly dependent on technician skill. In addition, extraction of embedded wires/conductors with such general-use manual tools can be tedious and time-consuming in order to avoid damage to the wires/conductors and harm to the technician.

Accordingly, an embedded wire removal tool is disclosed that facilitates safe removal of embedded wires/conductors from a cable with greatly reduced risk of damage to the wires/conductors. In one aspect, the embedded wire removal tool can facilitate consistent repair of a damaged or spliced cable. The embedded wire removal tool can include a feed mechanism operable to cause movement of a cable. The cable can have a jacket about a core. The cable can also include a wire disposed about the core and at least partially embedded in the jacket. The embedded wire removal tool can also include a jacket cutter operable to receive the cable from the feed mechanism and remove at least a portion of the jacket. In addition, the embedded wire removal tool can include a wire excavator operable to separate the wire from the core.

An embedded wire removal system is disclosed that can include a cable having a jacket about a core. The cable can also include a wire disposed about the core and at least partially embedded in the jacket. The system can also include an embedded wire removal tool operable to remove the wire from at least a portion of the cable. The embedded wire removal tool can include a feed mechanism operable to cause movement of the cable. The embedded wire removal tool can also include a jacket cutter operable to receive the cable from the feed mechanism and remove at least a portion of the jacket. Additionally, the embedded wire removal tool can include a wire excavator operable to separate the wire from the core.

Also disclosed is a method for facilitating removal of an embedded wire of a cable having a jacket about a core, the wire disposed about the core and at least partially embedded in the jacket. The method can comprise configuring an embedded wire removal tool to comprise a feed mechanism operable to cause movement of the cable. The method can comprise configuring the embedded wire removal tool to comprise a jacket cutter operable to receive the cable from the feed mechanism and remove at least a portion of the jacket. The method can comprise configuring the embedded wire removal tool to comprise a wire excavator operable to separate the wire from the core.

The method can further comprise configuring the embedded wire removal tool to comprise a heater operable to heat the cable and facilitate separation of the wire from the core.

The method can further comprise configuring the embedded wire removal tool to comprise a frame to support the feed mechanism, the jacket cutter, and the wire excavator.

The method can further comprise configuring the embedded wire removal tool such that the feed mechanism is operable to cause linear translation of the cable at a feed rate, and rotation of the wire excavator about the cable is coordinated with the feed rate such that movement of the wire excavator about the core matches a helical configuration of the wire.

The method can further comprise configuring the embedded wire removal tool to comprise a drive train operably coupled to the feed mechanism and the wire excavator to coordinate the rotation of the wire excavator about the cable with the feed rate, and to comprise a drive train operably coupled to the feed mechanism and the jacket cutter to coordinate rotation of the jacket cutter about the cable with the feed rate to achieve a predetermined depth of cut.

Figure 2:
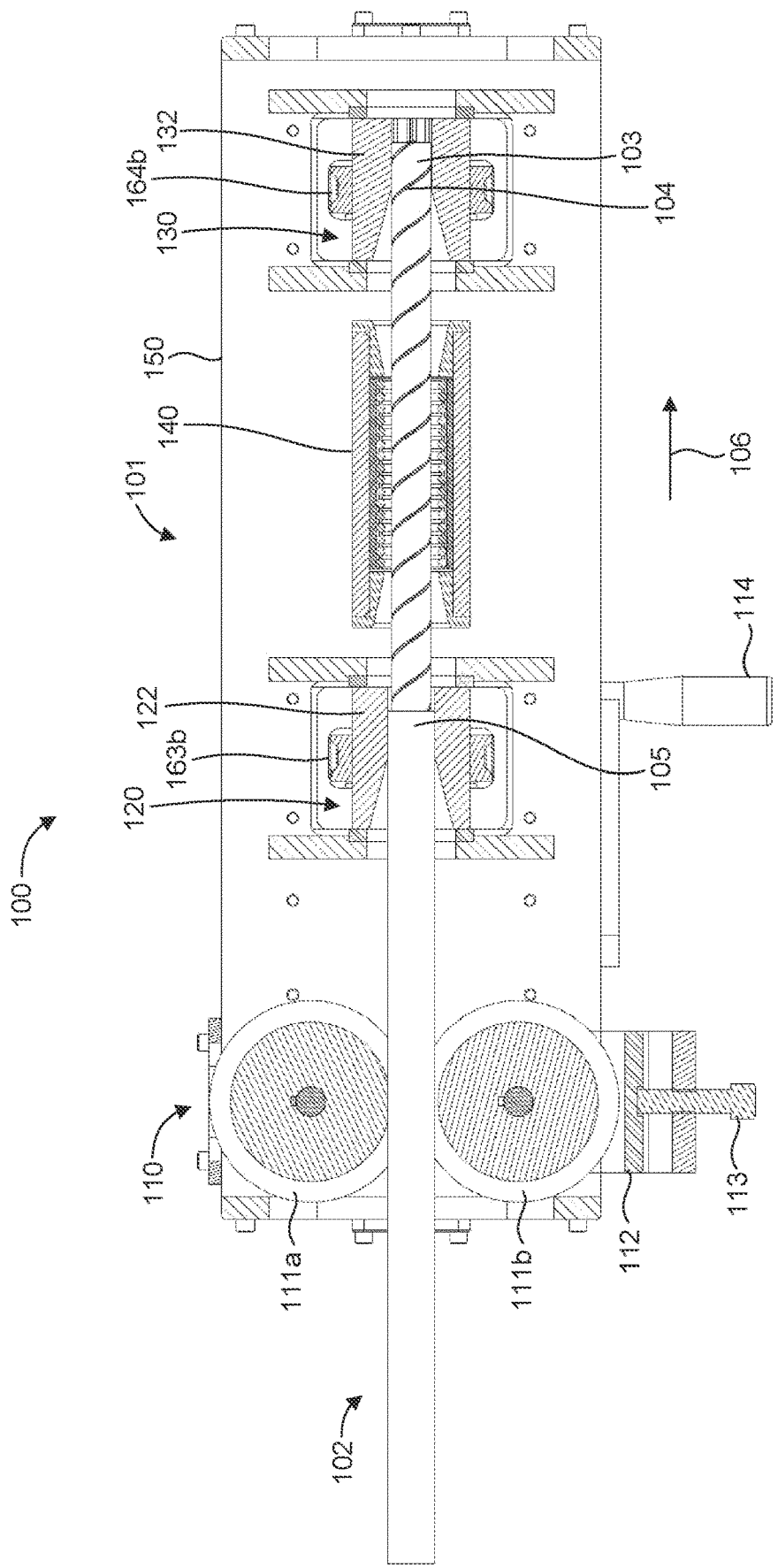
FIG. 2 is a side cross-sectional view of the embedded wire removal system of FIG. 1.
Figure 3A:
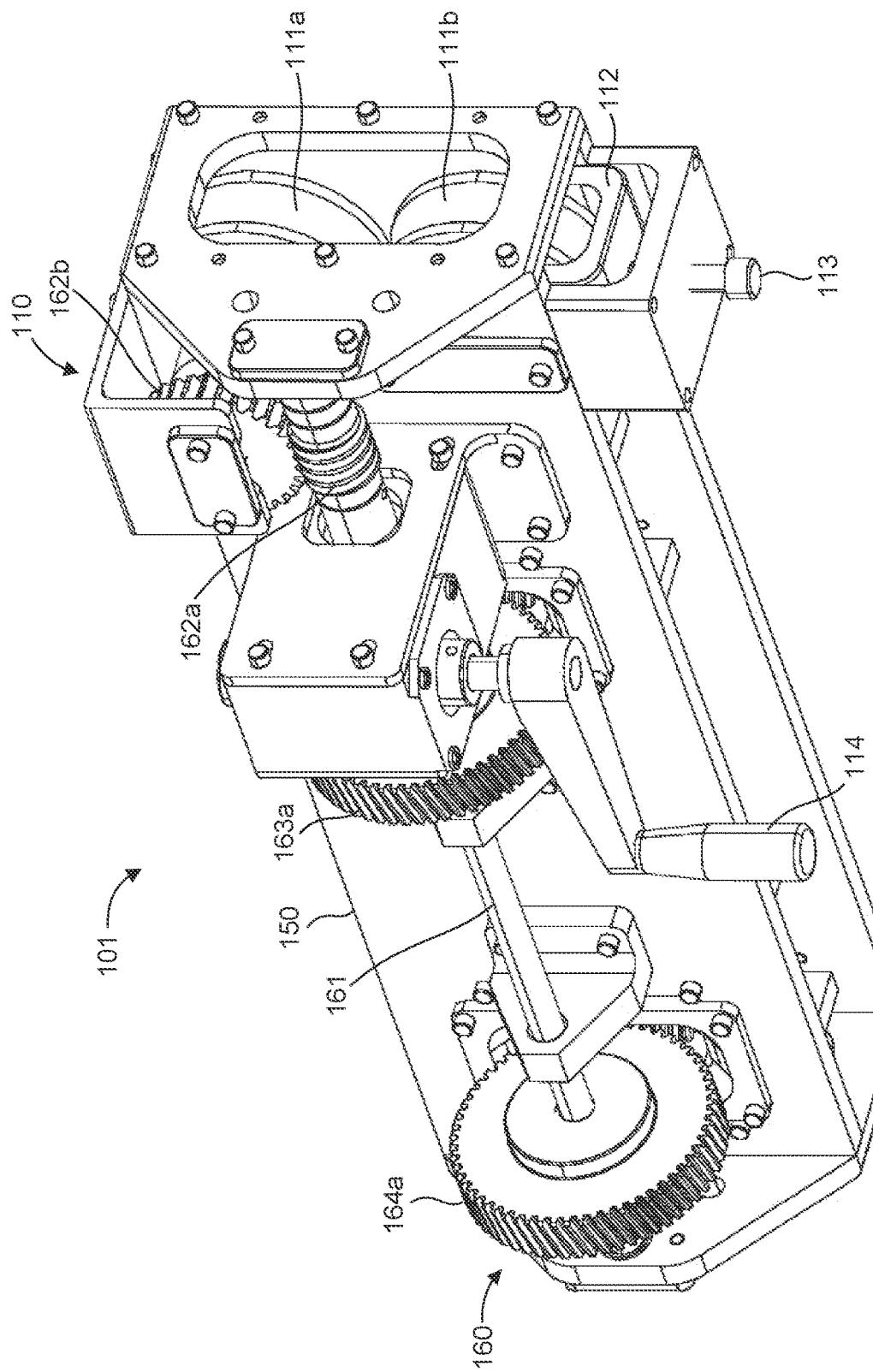
FIGS. 3A-3C are perspective views of an embedded wire removal tool of the system of FIG. 1.
Figure 3B:
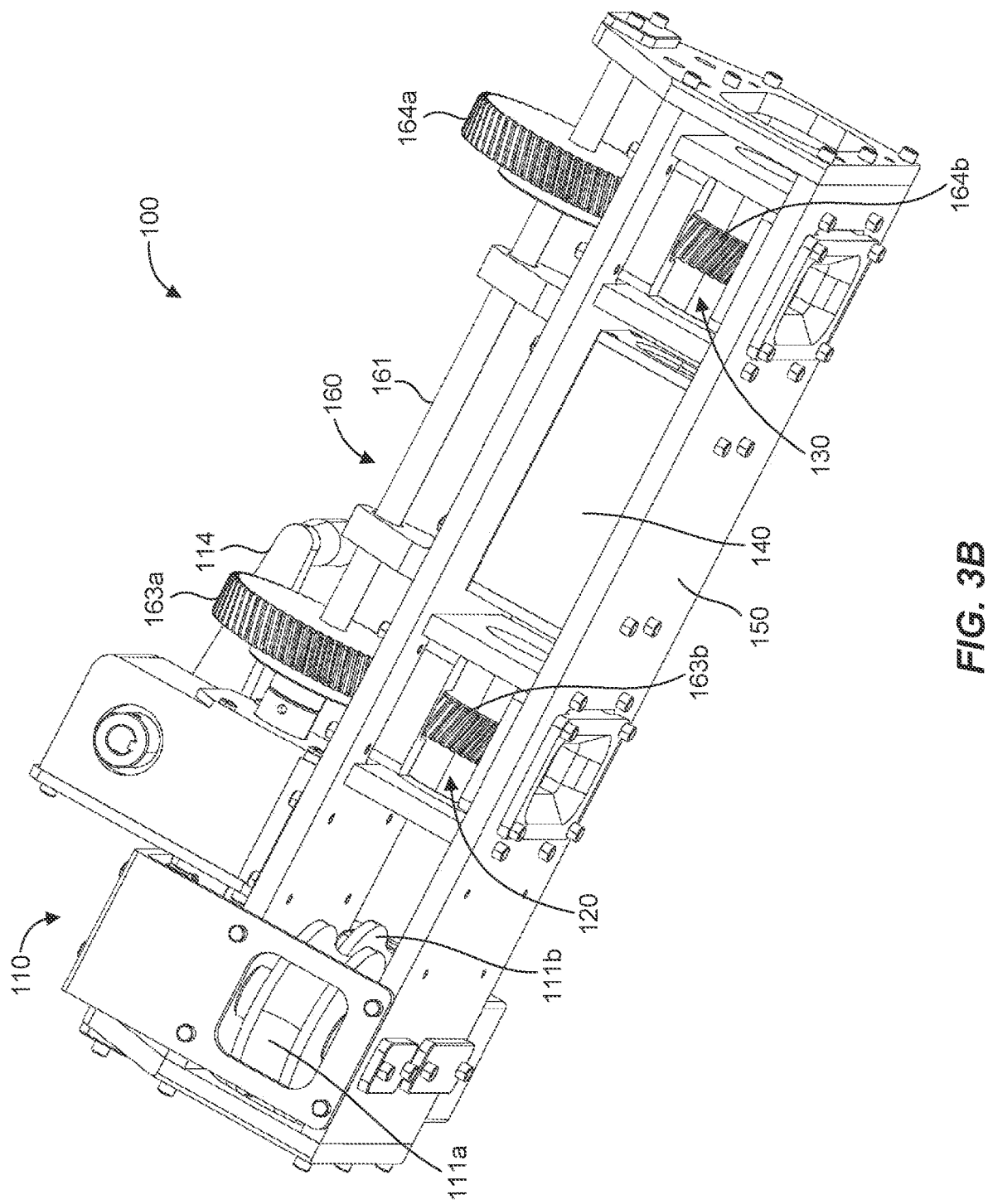
Figure 3C:
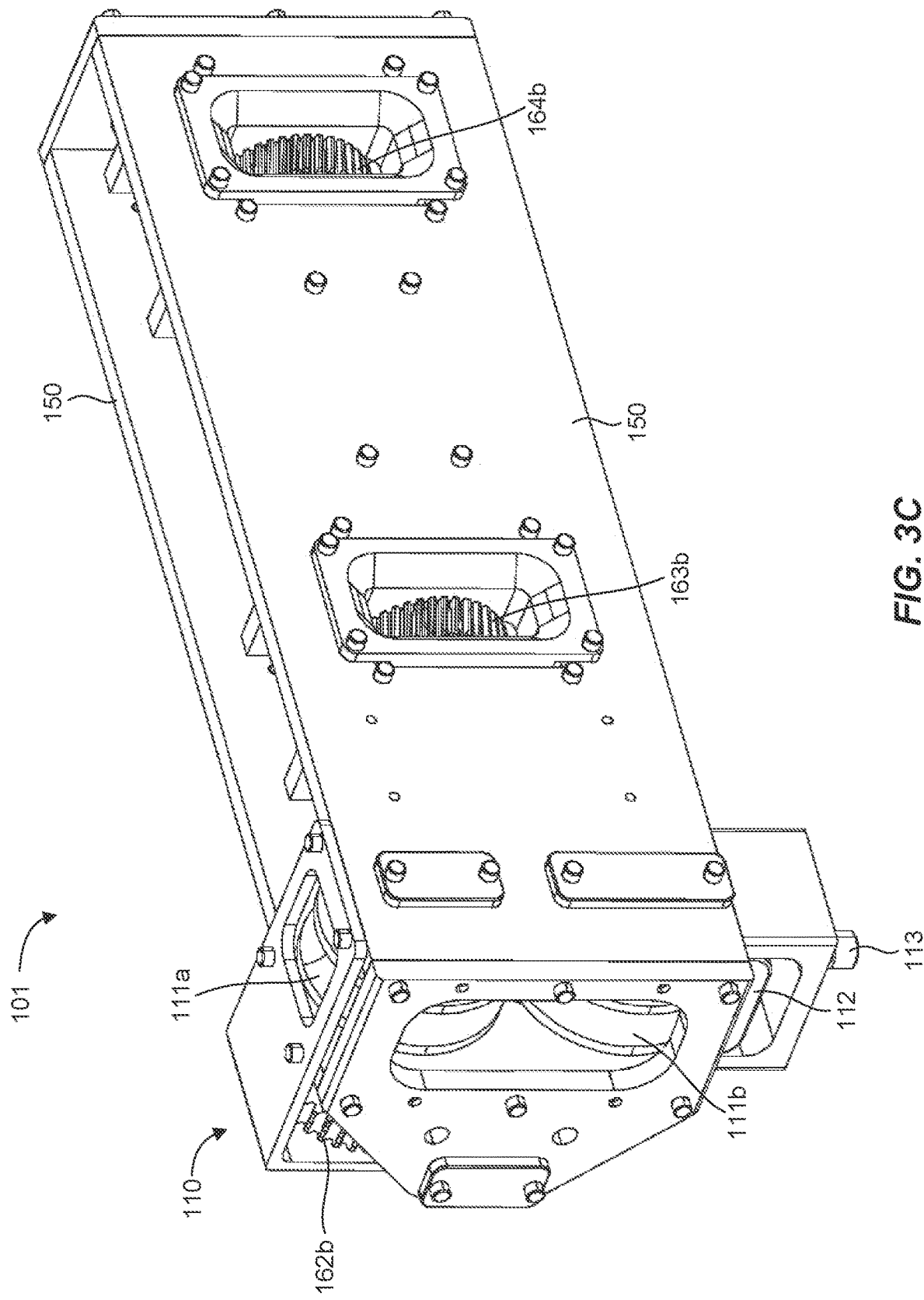

To further describe the present technology, examples are now provided with reference to the figures. With reference to FIG. 1, one embodiment of an embedded wire removal system 100 is illustrated. The embedded wire removal system 100 can comprise an embedded wire removal tool 101 and a cable 102. A cross-sectional view of the system 100 is shown in FIG. 2, with the cable 102 engaged with the embedded wire removal tool 101. The embedded wire removal tool 101 is shown isolated from the cable 102 in FIGS. 3A-3C. The cable 102 can have a core 103, a wire 104 (e.g., a low-voltage wire) disposed about the core 103, and a jacket 105 or sheathing about the core 103 and the wire 104. In some examples, the wire 104 can be at least partially embedded in the jacket 105, which can be an over-extrusion that encapsulates the wire 104. The embedded wire removal tool 101 can be operable to remove the wire 104 from at least a portion of the cable 102, which can facilitate repairing the cable 102, splicing the cable 102, etc. The core 103 is represented generically and can include one or more conductors, insulating material, shielding, etc. In some examples, the wire 104 can be wound in a helical configuration about the core 103, as illustrated in FIG. 1. The jacket 105 can be constructed of any suitable material, such as polyethylene.

In general, the embedded wire removal tool 101 can include a cable feed mechanism 110 (hereinafter "cable feed mechanism" or simply "feed mechanism") operable to cause movement of the cable 102, a jacket cutter 120 operable to receive the cable 102 from the feed mechanism 110 and remove at least a portion of the jacket 105, and a wire excavator 130 operable to separate the wire 104 from the core 103. In some examples, the embedded wire removal tool 101 can include a heater 140 operable to heat the cable 102 to facilitate separation of the wire 104 from the core 103. The embedded wire removal tool 101 can include a frame 150 configured to support various components of the tool 101, such as the feed mechanism 110, the jacket cutter 120, the heater 140, and the wire excavator 130.

The feed mechanism 110 can include one or more rollers or wheels 111a, 111b operable to interface with the cable 102 and feed the cable 102 through the tool 101. The rollers 111a, 111b can be configured to grip the cable 102 with sufficient friction to cause movement of the cable 102 (e.g., linear translation in direction 106) through the tool 101. In one aspect, one or both of the rollers 111a, 111b can be adjustable to provide adequate grip on the cable 102. For example, the roller 111a can be supported by the frame 150 at a fixed location, and the roller 111b can be supported by the frame 150 and movable relative to the roller 111a. In the illustrated example, the roller 111b is mounted on a bracket 112 that is slidable relative to the frame 150 to position the roller 111b at a suitable location relative to the roller 111a in order to adequately grip the cable 102 and enable feeding the cable 102 through the tool 101 during use. The position of the roller 111b can be adjusted and maintained by an adjustment screw 113 that functions as a lead screw operable with the bracket 112 to move the bracket 112 (and the supported roller 111b) relative to the frame 150 (and the roller 111a).

The rollers 111a, 111b can be driven by any suitable device, such as a motor and/or a manually operated device. For example, the feed mechanism 110 can include a manual crank 114 operably coupled to the rollers 111a, 111b by a drive train 160 to transfer torque from the manual crank 114 to the rollers 111a, 111b for advancing or feeding the cable 102 through the tool 101. In the illustrated example, the drive train 160 can include a drive shaft 161 and gears 162a, 162b operably coupled to the roller 111a to provide a driving force to the cable 102.

In one aspect, the jacket cutter 120 can be operable to rotate about the cable 102 to remove at least a portion of the jacket 105. For example, as shown in FIGS. 4A-5, the jacket cutter 120 can include a blade 121 coupled to a blade support 122. In some examples, the blade 121 can be formed in a blade insert 126 that can be removably coupled to the blade support 122. In other examples, the blade 121 can be integrally formed or permanently attached to the blade support 122. The blade support 122 can have a cable opening 123 operable to receive the cable 102. The cable opening 123 can be defined at least in part by a funnel portion 124 and a throat portion 125 sized to be slightly larger than the outer diameter of the cable jacket 105. The blade 121 can be associated with the throat portion 125. The funnel portion 124 can guide the cable 102 into the throat portion 125, where the cable 102 can be captured and prevented from bending or deflecting laterally while the blade 121 rotates about the cable 102 and cuts into the jacket 105 at a depth sufficient to expose or nearly expose the underlying wire 104. The radial depth of cut can be configured to remove all or only a portion of a thickness of the jacket 105 over the core 103. Thus, the jacket cutter 120 can be configured to cut away the jacket 105 to a desired size or diameter to facilitate removal of the wire 104.

The feed roller 110 can be operable to cause linear translation of the cable 102 in the direction 106 at a feed rate. In one aspect, the drive train 160 can be operably coupled to the feed mechanism 110 and the jacket cutter 120 to coordinate and synchronize rotation of the jacket cutter 120 about the cable 102 (e.g., cutting speed) with the linear feed rate of the cable 102 to achieve a predetermined linear depth of cut. The linear depth of cut should not exceed the length of the blade 121 in order to ensure that the jacket material is successfully removed and does not leave an uncut spiral of jacket material on the cable 102. In the illustrated example, the drive train 160 can include gears 163a, 163b operably coupled to the manual crank 114 via the drive shaft 161 to provide a torque for rotating the jacket cutter 120. As mentioned above, the drive shaft 161 can be coupled to the feed mechanism 110. Thus, the feed rate of the cable 102 provided by the feed mechanism 110 can be directly tied to the rotation of the jacket cutter 120, which can be predetermined for coordinated and synchronized linear movement of the cable 102 and cutting of the jacket 105.

To accommodate cables of different sizes and configurations (e.g., outer diameter, core diameter, wire helical winding, etc.), the jacket cutter 120 (e.g., the blade insert 126) can be provided in different sizes and configurations to suit a given cable. In one aspect, the gear 163a and/or the gear 163b can be provided with different numbers of teeth, which can be selected along with a suitable jacket cutter 120 (e.g., the blade insert 126) to properly cut the jacket 105 in accordance with the principles disclosed herein.

The heater 140 can receive the cable 102 from the jacket cutter 120. The heater 140 can heat any remaining jacket material (e.g., a thin layer of jacket material) that may be located over the core 103 and wire 104 to soften the remaining jacket material in preparation for removal of the wire 104. In one aspect, the heater 140 can melt the remaining jacket material sufficient to provide a uniform exterior surface (e.g., smooth the surface remaining from the prior jacket cutting operation). The heater 140 can be or include any suitable heater type or heating element. In some examples, the heater 140 can comprise a resistance heater.

Figure 6A:
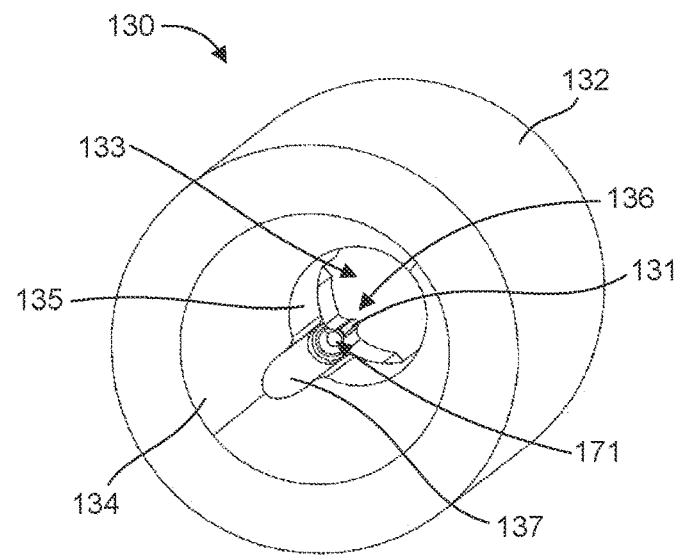
FIGS. 6A and 6B are perspective views of a wire excavator of the embedded wire removal tool of FIGS. 1-3C.
Figure 6B:
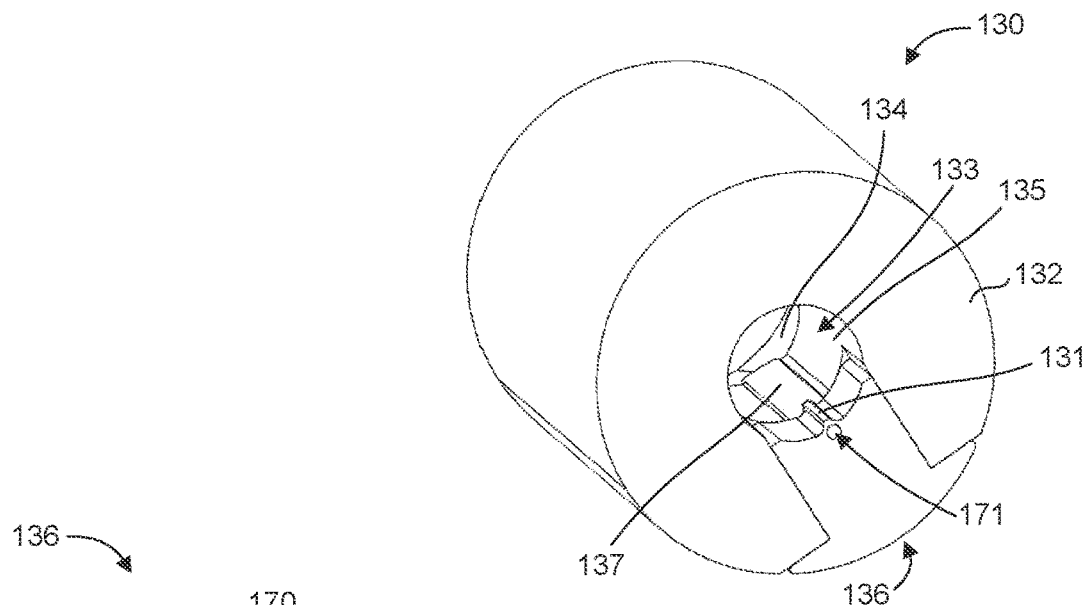
Figure 7:
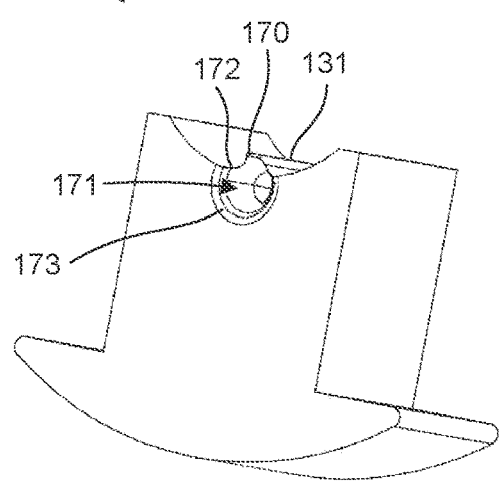
FIG. 7 illustrates a scoop insert of the jacket cutter of FIGS. 6A and 6B.

The wire excavator 130 can receive the cable 102 from the heater 140. In one aspect, the wire excavator 130 can be operable to engage the wire 104 and rotate about the cable 102 to separate the wire 104 from the core 103. For example, as shown in FIGS. 6A-7, the wire excavator 130 can include a scoop 131 coupled to a scoop support 132. In some examples, the scoop 131 can be formed in a scoop insert 136 that can be removably coupled to the scoop support 132. In other examples, the scoop 131 can be integrally formed or permanently attached to the scoop support 132. The scoop 131 can include a lip 170 configured to extend radially inward of the wire 104. The lip 170 can at least partially define a wire opening 171 configured to receive the wire 104. The lip 170 can also at least partially define a cutting edge 172 operable to cut into any remaining jacket material and/or the core 103 to facilitate separating the wire 104 from the core 103. An entrance 173 to the wire opening 171 can have a funnel configuration to facilitate guiding the wire 104 into the wire opening 171.

The scoop support 132 can have a cable opening 133 operable to receive the cable 102. The cable opening 133 can be defined at least in part by a funnel portion 134 and a throat portion 135 sized to be slightly larger than the outer diameter of the remaining cable 102 (e.g., the remaining cable jacket 105 material or the core 103). The scoop 131 can be associated with the throat portion 135. The throat portion 135 can also include a wire guide 137 configured to capture the wire 104 and guide the wire 104 into the scoop 131. The funnel portion 134 can guide the cable 102 into the throat portion 135, where the cable 102 can be captured and prevented from bending or deflecting laterally while the scoop 131 engages the wire 104 and rotates about the cable 102 to separate the wire 104 from the core 103.

Figure 8:
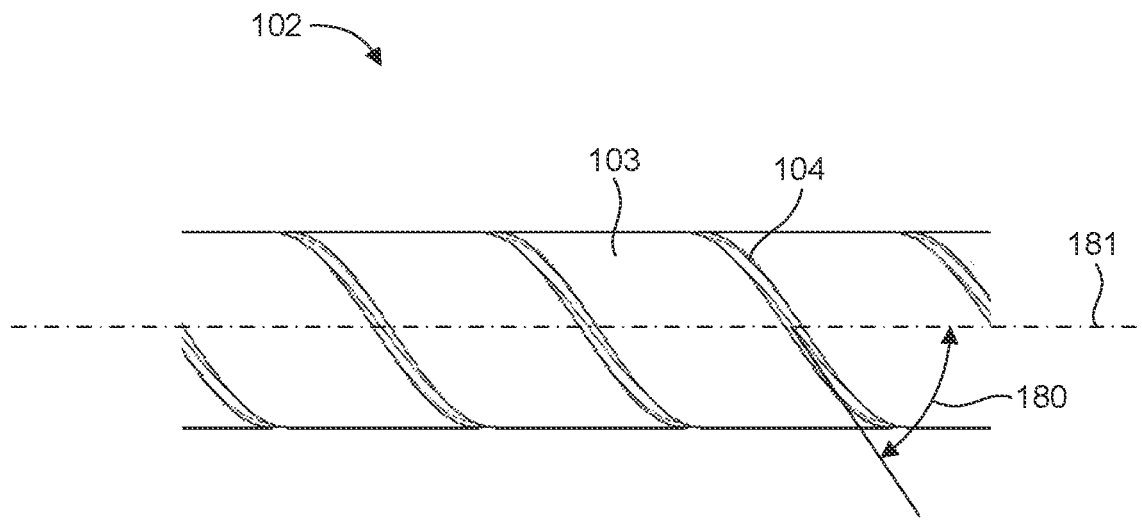
FIG. 8 is a view of a cable of the system of FIG. 1 illustrating a helical wire, in accordance with an example of the present disclosure.

As mentioned above the wire 104 can have a helical configuration (e.g., spiral wound) about the core 103. As illustrated in FIG. 8, the helix shape of the wire 104 can have a helix angle 180 with respect to a longitudinal axis 181 of the cable 102. In one aspect, the drive train 160 can be operably coupled to the feed mechanism 110 and the wire excavator 130 to coordinate and synchronize rotation of the wire excavator 130 about the cable 102 with the linear feed rate of the cable 102 such that the scoop 131 follows the helix of the wire 104. In the illustrated example, the drive train 160 can include gears 164a, 164b operably coupled to the manual crank 114 via the drive shaft 161 to provide a torque for rotating the wire excavator 130. As mentioned above, the drive shaft 161 can be coupled to the feed mechanism 110. Thus, the feed rate of the cable 102 provided by the feed mechanism 110 can be directly tied to the rotation of the wire excavator 130, which can be predetermined for coordinated and synchronized linear movement of the cable 102 and the rotation of the wire excavator 130 to follow the helical shape of the wire 104 as the cable passes through the wire excavator 130. In other words, rotation of the wire excavator 130 about the cable 102 can be coordinated and synchronized with the feed rate such that movement of the wire excavator 130 about the core 103 matches the helical configuration of the wire 104 to excavate the wire 104 from the cable 102 without damaging the wire 104. This can facilitate reuse of the wire 104 (e.g., in splicing or repair of the cable 102).

Figure 9:
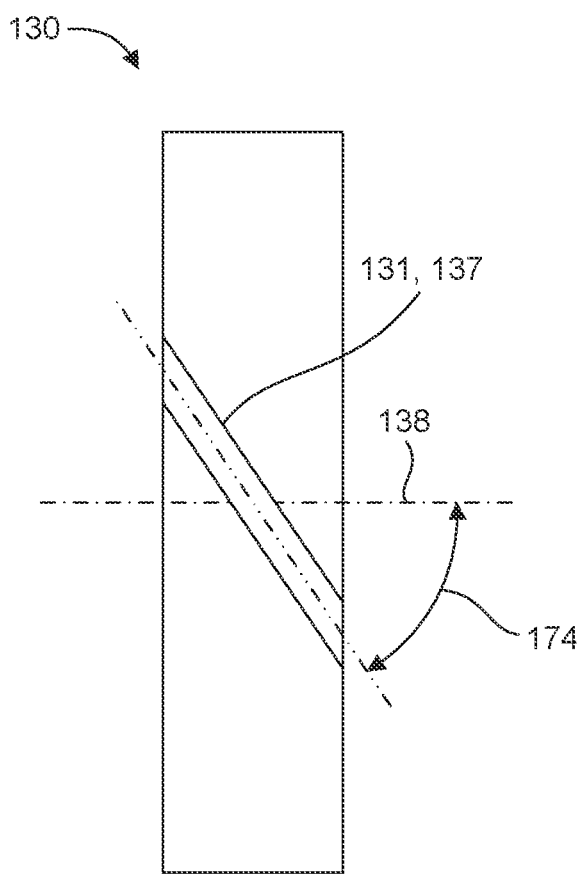
FIG. 9 is a schematic illustration of a wire excavator of the embedded wire removal tool of FIGS. 1-3C.

In one aspect, as illustrated in FIG. 9, the scoop 131 (and/or the wire guide 137) can be oriented to match the angle of the wire 104. For example, the scoop 131 (and/or the wire guide 137) can be oriented at an excavation angle 174 relative to a longitudinal axis 138 of the wire excavator 130. The longitudinal axis 181 (FIG. 8) of the cable 102 can be parallel to the longitudinal axis 138 of the wire excavator 130 during use. The excavation angle 174 can be substantially the same as or equal to the helix angle 180 (FIG. 8) of the wire 104 to facilitate alignment of the scoop 131 (and/or the wire guide 137) with the wire 104 to ease removal of the wire 104 from the cable 102.

To accommodate cables of different sizes and configurations (e.g., outer diameter, core diameter, wire helical winding, etc.), the wire excavator 130 (e.g., the scoop insert 136) can be provided in different sizes and configurations to suit a given cable. In one aspect, the gear 164a and/or the gear 164b can be provided with different numbers of teeth, which can be selected along with a suitable wire excavator 130 (e.g., the scoop insert 136) to properly excavate the wire 104 in accordance with the principles disclosed herein.

Thus, the embedded wire removal tool 101 as disclosed herein can simultaneously perform four functions: feed the cable 102, remove at least a portion of the jacket 105, heat the remaining outer material of the cable 102, and remove the wire 104 from the cable 102 without damaging the wire 104. The embedded wire removal tool 101 can perform all these functions in a single setup, providing reduced risk of cable damage, faster cable preparation, and consistent repair of a damaged or spliced cable. In one aspect, a single drive train 160 can be operable to transfer drive input from a source (e.g., torque applied manually via the manual crank 114) to operate the feed mechanism 110, the jacket cutter 120, and the wire excavator 130 in a coordinated and synchronous manner.

Figure 10:
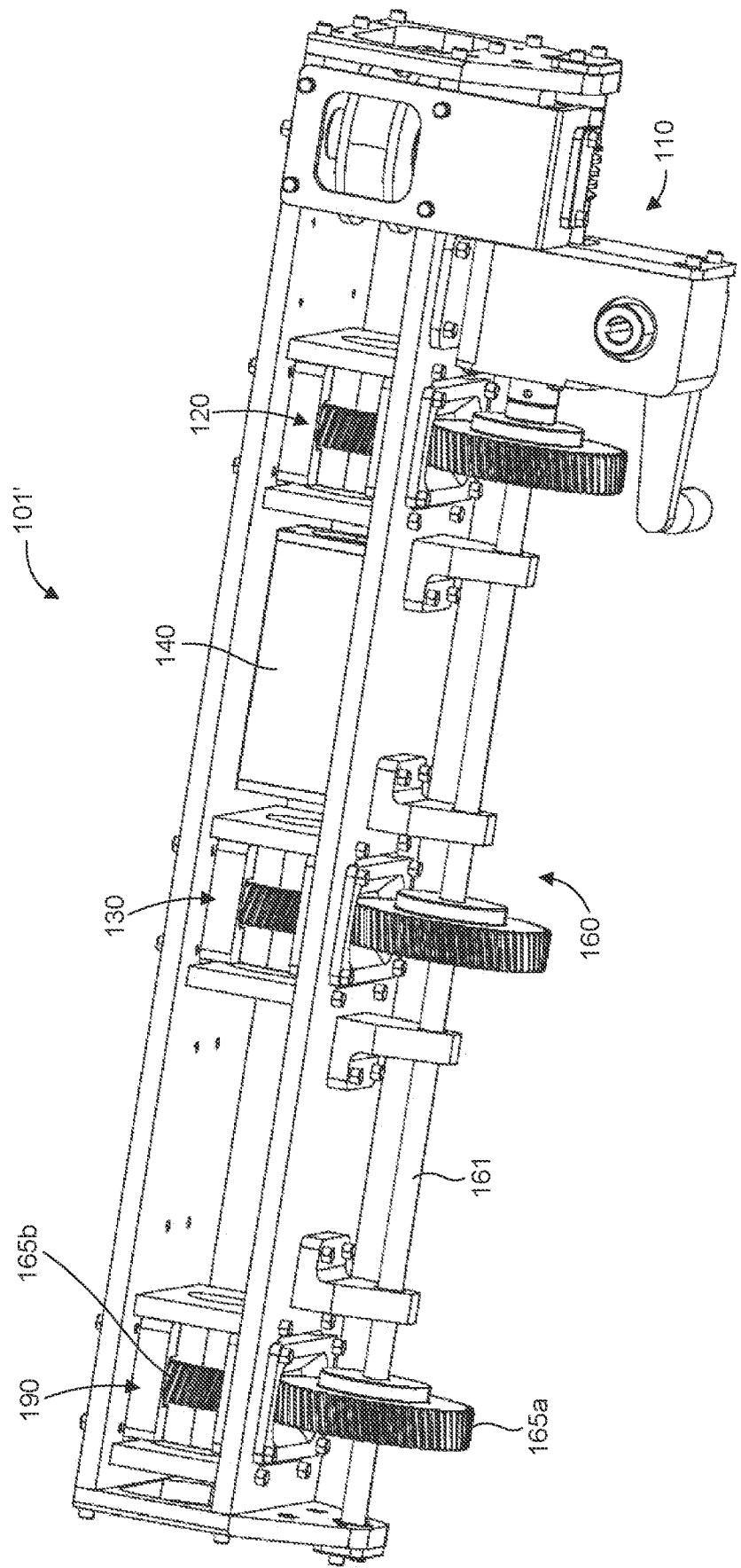
FIG. 10 illustrates an embedded wire removal tool in accordance with an example of the present disclosure.

FIG. 10 illustrates an embedded wire removal tool 101' in accordance with another example of the present disclosure. The tool 101' is similar to the tool 101 discussed above in most respects. These similarities are not discussed in detail with reference to FIG. 10. In the FIG. 10 example, the tool 101' includes an additional cutter, specifically, a finishing cutter 190. The finishing cutter 190 can be operable to receive the cable 102 from the wire excavator 130 once the wire 104 has been separated from the cable 102, and remove a portion of the jacket 105 and/or a portion of the core 103 to provide a uniform outer surface of the cable 102. The finishing cutter 190 is similar to the jacket cutter 120 with a reduced size (e.g., radial position of the blade) to accommodate the reduced size the cable 102 at this stage of the operation.

In one aspect, the drive train 160 can be operably coupled to the feed mechanism 110 and the finishing cutter 190 to coordinate and synchronize rotation of the finishing cutter 190 about the cable 102 (e.g., cutting speed) with the linear feed rate of the cable 102 to achieve a predetermined linear depth of cut. In the illustrated example, the drive train 160 can include gears 165a, 165b operably coupled to the manual crank 114 via the drive shaft 161 to provide a torque for rotating the finishing cutter 190. As mentioned above, the drive shaft 161 can be coupled to the feed mechanism 110. Thus, the feed rate of the cable 102 provided by the feed mechanism 110 can be directly tied to the rotation of the finishing cutter 190, which can be predetermined for coordinated and synchronized linear movement of the cable 102 and cutting of a portion of the jacket 105 and/or a portion of the core 103.

To accommodate cables of different sizes and configurations (e.g., outer diameter, core diameter, wire helical winding, etc.), the finishing cutter 190 (e.g., a blade insert) can be provided in different sizes and configurations to suit a given cable. In one aspect, the gear 165a and/or the gear 165b can be provided with different numbers of teeth, which can be selected along with a suitable finishing cutter 190 (e.g., a blade insert) to properly cut a portion of the jacket 105 and/or a portion of the core 103 in accordance with the principles disclosed herein.

Also disclosed herein is a method for facilitating removal of an embedded wire of a cable having a jacket about a core, the wire disposed about the core and at least partially embedded in the jacket. In one example, the method can comprise configuring an embedded wire removal tool as the embedded wire removal tool 101 discussed above with respect to FIGS. 1-9. In another example, the method can comprise configuring an embedded wire removal tool as the embedded wire removal tool 101' discussed above with respect to FIGS. 1-9.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for facilitating removal of an embedded wire of a cable having a jacket about a core, the wire disposed about the core and at least partially embedded in the jacket, the method comprising:
   configuring an embedded wire removal tool to comprise a feed mechanism operable to cause movement of the cable;
   configuring the embedded wire removal tool to comprise a jacket cutter operable to receive the cable from the feed mechanism and remove at least a portion of the jacket;
   configuring the embedded wire removal tool to comprise a wire excavator operable to separate the wire from the core; and
   configuring the embedded wire removal tool to comprise a heater operable to heat the cable and facilitate separation of the wire from the core, wherein the heater receives the cable from the jacket cutter, and the wire excavator receives the cable from the heater.

2. The method of claim 1, further comprising configuring the embedded wire removal tool to comprise a frame to support the feed mechanism, the jacket cutter, and the wire excavator.

3. The method of claim 1, further comprising configuring the embedded wire removal tool such that the feed mechanism is operable to cause linear translation of the cable at a feed rate, and rotation of the wire excavator about the cable is coordinated with the feed rate such that movement of the wire excavator about the core matches a helical configuration of the wire.

4. The method of claim 1, further comprising:
   configuring the embedded wire removal tool such that the feed mechanism is operable to cause linear translation of the cable at a feed rate; and
   configuring the embedded wire removal tool to comprise a drive train operably coupled to the feed mechanism and the wire excavator to coordinate rotation of the wire excavator about the cable with the feed rate, and wherein the drive train is further operably coupled to the feed mechanism and the jacket cutter to coordinate rotation of the jacket cutter about the cable with the feed rate to achieve a predetermined depth of cut.

5. An embedded wire removal tool, comprising:
   a feed mechanism operable to cause movement of a cable, the cable having a jacket about a core, and a wire disposed about the core and at least partially embedded in the jacket;
   a jacket cutter operable to receive the cable from the feed mechanism and remove at least a portion of the jacket;
   a wire excavator operable to separate the wire from the core; and
   a heater operable to heat the cable and facilitate separation of the wire from the core, wherein the heater receives the cable from the jacket cutter, and the wire excavator receives the cable from the heater.

6. The embedded wire removal tool of claim 5, further comprising a frame configured to support the feed mechanism, the jacket cutter, and the wire excavator.

7. The embedded wire removal tool of claim 5, wherein the wire excavator is operable to engage the wire and rotate about the cable to separate the wire from the core.

8. The embedded wire removal tool of claim 7 wherein the feed mechanism is operable to cause linear translation of the cable at a feed rate, and rotation of the wire excavator about the cable is coordinated with the feed rate such that movement of the wire excavator about the core matches a helical configuration of the wire.

9. The embedded wire removal tool of claim 8, further comprising a drive train operably coupled to the feed mechanism and the wire excavator to coordinate the rotation of the wire excavator about the cable with the feed rate.

10. The embedded wire removal tool of claim 5, wherein the jacket cutter is operable to rotate about the cable to remove the at least the portion of the jacket.

11. The embedded wire removal tool of claim 10, further comprising a drive train operably coupled to the feed mechanism and the jacket cutter;
wherein the feed mechanism is operable to cause linear translation of the cable at a feed rate; and
wherein the drive train is operable to coordinate rotation of the jacket cutter about the cable with the feed rate to achieve a predetermined depth of cut.

12. The embedded wire removal tool of claim 5, further comprising a finishing cutter operable to receive the cable from the wire excavator and remove at least one of a portion of the jacket or a portion of the core to provide a uniform outer surface of the cable.

13. The embedded wire removal tool of claim 12, further comprising a drive train operably coupled to the feed mechanism and the finishing cutter;
wherein the feed mechanism is operable to cause linear translation of the cable at a feed rate;
wherein the finishing cutter is operable to rotate about the cable to remove the at least one of the portion of the jacket or the portion of the core, and
wherein the drive train is operable to coordinate rotation of the finishing cutter about the cable with the feed rate to achieve a predetermined depth of cut.

14. The embedded wire removal tool of claim 5, wherein the feed mechanism comprises a feed roller configured to interface with the cable.

15. The embedded wire removal tool of claim 14, wherein the feed mechanism further comprises a manual crank operably coupled to the feed roller to cause movement of the cable.

16. An embedded wire removal system, comprising:
a cable having a jacket about a core, and a wire disposed about the core and at least partially embedded in the jacket; and
an embedded wire removal tool operable to remove the wire from at least a portion of the cable, the embedded wire removal tool comprising
a feed mechanism operable to cause movement of the cable,
a jacket cutter operable to receive the cable from the feed mechanism and remove at least a portion of the jacket,
a wire excavator operable to separate the wire from the core, and
a heater operable to heat the cable and facilitate separation of the wire from the core, wherein the heater receives the cable from the jacket cutter, and the wire excavator receives the cable from the heater.

17. The system of claim 16, wherein the wire is a low-voltage wire.

18. An embedded wire removal tool, comprising:
a feed mechanism operable to cause movement of a cable, the cable having a jacket about a core, and a wire disposed about the core and at least partially embedded in the jacket;
a jacket cutter operable to receive the cable from the feed mechanism and remove at least a portion of the jacket;
a wire excavator operable to separate the wire from the core,
wherein the wire excavator is operable to engage the wire and rotate about the cable to separate the wire from the core.

19. An embedded wire removal tool, comprising:
a feed mechanism operable to cause movement of a cable, the cable having a jacket about a core, and a wire disposed about the core and at least partially embedded in the jacket;
a jacket cutter operable to receive the cable from the feed mechanism and remove at least a portion of the jacket;
a wire excavator operable to separate the wire from the core,
wherein the jacket cutter is operable to rotate about the cable to remove the at least the portion of the jacket, the jacket cutter comprising a cable opening to receive the cable, and a blade protruding into the cable opening.

20. An embedded wire removal tool, comprising:
a feed mechanism operable to cause movement of a cable, the cable having a jacket about a core, and a wire disposed about the core and at least partially embedded in the jacket;
a jacket cutter operable to receive the cable from the feed mechanism and remove at least a portion of the jacket;
a wire excavator operable to separate the wire from the core; and
a finishing cutter operable to receive the cable from the wire excavator and remove at least one of a portion of the jacket or a portion of the core to provide a uniform outer surface of the cable.

21. An embedded wire removal tool, comprising:
a feed mechanism operable to cause movement of a cable, the cable having a jacket about a core, and a wire disposed about the core and at least partially embedded in the jacket;
a jacket cutter operable to receive the cable from the feed mechanism and remove at least a portion of the jacket;
a wire excavator operable to separate the wire from the core,
wherein the feed mechanism comprises a feed roller configured to interface with the cable, and
wherein the feed mechanism further comprises a manual crank operably coupled to the feed roller to cause movement of the cable.

22. A method for facilitating removal of an embedded wire of a cable having a jacket about a core, the wire disposed about the core and at least partially embedded in the jacket, the method comprising:
configuring an embedded wire removal tool to comprise a feed mechanism operable to cause movement of the cable;
configuring the embedded wire removal tool to comprise a jacket cutter operable to receive the cable from the feed mechanism and remove at least a portion of the jacket;
configuring the embedded wire removal tool to comprise a wire excavator operable to separate the wire from the core; and
configuring the embedded wire removal tool such that the feed mechanism is operable to cause linear translation of the cable at a feed rate, and rotation of the wire excavator about the cable is coordinated with the feed rate such that movement of the wire excavator about the core matches a helical configuration of the wire.

23. A method for facilitating removal of an embedded wire of a cable having a jacket about a core, the wire disposed about the core and at least partially embedded in the jacket, the method comprising:

configuring an embedded wire removal tool to comprise a feed mechanism operable to cause movement of the cable;

configuring the embedded wire removal tool to comprise a jacket cutter operable to receive the cable from the feed mechanism and remove at least a portion of the jacket;

configuring the embedded wire removal tool to comprise a wire excavator operable to separate the wire from the core;

configuring the embedded wire removal tool such that the feed mechanism is operable to cause linear translation of the cable at a feed rate; and configuring the embedded wire removal tool to comprise a drive train operably coupled to the feed mechanism and the wire excavator to coordinate rotation of the wire excavator about the cable with the feed rate, and wherein the drive train is further operably coupled to the feed mechanism and the jacket cutter to coordinate rotation of the jacket cutter about the cable with the feed rate to achieve a predetermined depth of cut.

\* \* \* \* \*